(12) United States Patent
Dykowski et al.

(10) Patent No.: US 7,610,979 B1
(45) Date of Patent: Nov. 3, 2009

(54) REVERSE DRIVE SYSTEM FOR A THREE-WHEELED VEHICLE

(75) Inventors: Richard G. Dykowski, Waukesha, WI (US); Michael A. Newton, Plymouth, WI (US); Tyler S. Kulig, New Berlin, WI (US)

(73) Assignee: Harley-Davidson Motor Company Group, LLC, Milwaukee, WI (US)

( * ) Notice: Subject to any disclaimer, the term of this patent is extended or adjusted under 35 U.S.C. 154(b) by 0 days.

(21) Appl. No.: 12/174,315

(22) Filed: Jul. 16, 2008

(51) Int. Cl.
*B62D 61/06* (2006.01)

(52) U.S. Cl. .................. 180/210; 180/213; 180/292; 180/65.6

(58) Field of Classification Search ............ 180/210, 180/213, 24.09, 292, 297, 65.6, 350, 374, 180/378, 383, 385
See application file for complete search history.

(56) References Cited

U.S. PATENT DOCUMENTS

| | | |
|---|---|---|
| 1,469,984 A | 10/1923 | Barlough |
| 1,790,614 A | 1/1931 | Leipert |
| 1,892,505 A | 12/1932 | Evans |
| 2,764,003 A | 9/1956 | Croset |
| 2,873,590 A | 2/1959 | Croset |
| 3,257,860 A | 6/1966 | Runde et al. |
| 3,475,923 A | 11/1969 | Spence |
| 3,747,720 A | 7/1973 | Jensen |
| 4,037,431 A | 7/1977 | Sugimoto |
| 4,078,445 A | 3/1978 | Kiser |
| 4,278,271 A | 7/1981 | Raidel |
| 4,328,879 A | 5/1982 | Tone |
| 4,331,348 A | 5/1982 | Raidel |
| 4,332,574 A | 6/1982 | Aoyama et al. |
| 4,437,535 A | 3/1984 | Winchell et al. |
| 4,486,183 A | 12/1984 | Posiviata et al. |
| 4,523,491 A * | 6/1985 | Dittmann, Jr. ............... 74/360 |
| 4,583,613 A | 4/1986 | Nakayama |
| 4,585,431 A | 4/1986 | Umeda et al. |
| 4,635,506 A | 1/1987 | Imaizumi et al. |
| 4,658,661 A | 4/1987 | Terashita |
| 4,754,662 A | 7/1988 | Misawa |
| 4,763,538 A * | 8/1988 | Fujita et al. .................. 74/6 |
| 4,794,998 A | 1/1989 | Iwai et al. |

(Continued)

FOREIGN PATENT DOCUMENTS

CH            584611         12/1976

(Continued)

OTHER PUBLICATIONS

Harley-Davidson Motor Company, Instructions, Sidecar Reverse Drive Kit, dated Aug. 15, 1996, 29 pages.

*Primary Examiner*—Toan C To
(74) *Attorney, Agent, or Firm*—Michael Best & Friedrich LLP

(57) ABSTRACT

A rear axle assembly for a vehicle having an engine and a rear wheel including an axle configured to couple to the rear wheel, a compensator bowl coupled to the axle and having a ring gear, and a drive member coupled to the compensator bowl. The drive member is configured to be driven by the engine to rotate the axle in a forward direction. The rear axle assembly also includes a motor selectively engageable with the ring gear. The motor is operable to drive the ring gear to rotate the axle in a reverse direction.

19 Claims, 8 Drawing Sheets

U.S. PATENT DOCUMENTS

| | | | |
|---|---|---|---|
| 4,827,148 A * | 5/1989 | Hirosawa et al. | 290/38 R |
| 4,869,332 A * | 9/1989 | Fujita et al. | 180/65.22 |
| 4,870,874 A | 10/1989 | Ito | |
| 4,923,028 A | 5/1990 | Yamashita et al. | |
| 4,974,695 A * | 12/1990 | Politte | 180/221 |
| 5,024,113 A | 6/1991 | Ito et al. | |
| 5,033,769 A | 7/1991 | Raidel | |
| 5,069,304 A | 12/1991 | Mann | |
| 5,215,171 A | 6/1993 | Longuet et al. | |
| 5,236,060 A | 8/1993 | Huber | |
| 5,240,087 A | 8/1993 | Parker | |
| 5,309,778 A | 5/1994 | Antonov | |
| 5,452,622 A | 9/1995 | Fenelon | |
| 5,499,689 A | 3/1996 | Johnson | |
| 5,519,294 A | 5/1996 | Chen et al. | |
| 5,564,981 A | 10/1996 | Iwabuchi et al. | |
| 5,667,029 A * | 9/1997 | Urban et al. | 180/65.23 |
| 5,692,577 A | 12/1997 | Dornbusch et al. | |
| 5,720,638 A | 2/1998 | Hale | |
| 5,899,291 A | 5/1999 | Dumais | |
| 5,956,998 A | 9/1999 | Fenelon | |
| 5,957,740 A | 9/1999 | Matsuda et al. | |
| 5,960,900 A | 10/1999 | Cheng | |
| 6,024,198 A | 2/2000 | Hamby et al. | |
| 6,045,448 A | 4/2000 | Kern et al. | |
| 6,054,826 A | 4/2000 | Murakami et al. | |
| 6,076,416 A | 6/2000 | Sputhe | |
| 6,179,078 B1 * | 1/2001 | Belloso | 180/69.6 |
| 6,213,237 B1 | 4/2001 | Willman | |
| 6,234,909 B1 | 5/2001 | Yetzke | |
| 6,267,192 B1 * | 7/2001 | Maier et al. | 180/219 |
| 6,371,461 B1 | 4/2002 | Stahl | |
| 6,457,374 B1 | 10/2002 | Shen | |
| 6,457,381 B1 * | 10/2002 | Nonaka et al. | 74/661 |
| 6,516,912 B2 | 2/2003 | Iwai et al. | |
| 6,641,154 B1 | 11/2003 | Vey et al. | |
| 6,659,819 B2 | 12/2003 | Fuse | |
| 6,708,579 B2 | 3/2004 | Punko | |
| 6,871,718 B2 | 3/2005 | McGuire | |
| 6,886,842 B2 | 5/2005 | Vey et al. | |
| 6,964,314 B1 | 11/2005 | Vey | |
| 7,017,697 B2 | 3/2006 | Yang | |
| 7,083,022 B2 | 8/2006 | McWhorter et al. | |
| D529,841 S | 10/2006 | Vey | |
| 7,143,734 B1 | 12/2006 | Leppanen et al. | |
| 7,156,197 B2 * | 1/2007 | Sanchez et al. | 180/219 |
| 7,311,636 B1 * | 12/2007 | Regula | 475/326 |
| 7,410,021 B1 * | 8/2008 | Belloso | 180/69.6 |
| 7,478,692 B2 * | 1/2009 | Taue et al. | 701/22 |
| 2003/0220146 A1 | 11/2003 | Bonninger et al. | |
| 2003/0221890 A1 | 12/2003 | Fecteau et al. | |
| 2006/0032688 A1 | 2/2006 | Sanchez et al. | |
| 2006/0205293 A1 | 9/2006 | Fuse | |
| 2007/0021249 A1 | 1/2007 | Shao et al. | |

FOREIGN PATENT DOCUMENTS

| | | |
|---|---|---|
| JP | 11059109 | 3/1999 |
| JP | 2001130212 | 5/2001 |
| JP | 2003056644 | 2/2003 |
| JP | 2003154804 | 5/2003 |
| WO | 03101816 | 12/2003 |

* cited by examiner

REVERSE DRIVE SYSTEM FOR A THREE-WHEELED VEHICLE

BACKGROUND

The present invention relates to reverse drive systems for vehicles and, more particularly, to reverse drive systems for three-wheeled vehicles.

Three-wheeled vehicles, or trikes, are typically manufactured using two-wheeled motorcycle frames as the foundation. Converting a two-wheeled motorcycle into a three-wheeled vehicle increases the weight of the vehicle. The trike therefore becomes harder to push and direct when, for example, parking or moving the trike in a reverse direction.

SUMMARY

In one embodiment, the invention provides a rear axle assembly for a vehicle. The vehicle includes an engine and a rear wheel. The rear axle assembly includes an axle configured to couple to the rear wheel, a compensator bowl coupled to the axle and having a ring gear, and a drive member coupled to the compensator bowl. The drive member is configured to be driven by the engine to rotate the axle in a forward direction. The rear axle assembly also includes a motor selectively engageable with the ring gear. The motor is operable to drive the ring gear to rotate the axle in a reverse direction.

In another embodiment, the invention provides a rear axle assembly for a vehicle. The vehicle includes an engine and a rear wheel. The rear axle assembly includes an axle configured to couple to the rear wheel and a drive member coupled to the axle. The drive member is configured to be driven by the engine to rotate the axle in a forward direction. The rear axle assembly also includes a gear coupled to the axle and a motor selectively engageable with the gear. The motor is operable to drive the gear to rotate the axle in a reverse direction. The rear axle assembly further includes at least one elastic member positioned between the drive member and the gear to isolate the drive member from the gear.

Other aspects of the invention will become apparent by consideration of the detailed description and accompanying drawings.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways. Also, it is to be understood that the phraseology and terminology used herein are for the purpose of description and should not be regarded as limiting. The use of "including," "comprising," or "having" and variations thereof herein is meant to encompass the items listed thereafter and equivalents thereof as well as additional items. Unless specified or limited otherwise, the terms "mounted," "connected," "supported," and "coupled" and variations thereof are used broadly and encompass both direct and indirect mountings, connections, supports, and couplings. Further, "connected" and "coupled" are not restricted to physical or mechanical connections or couplings.

Figure 1:
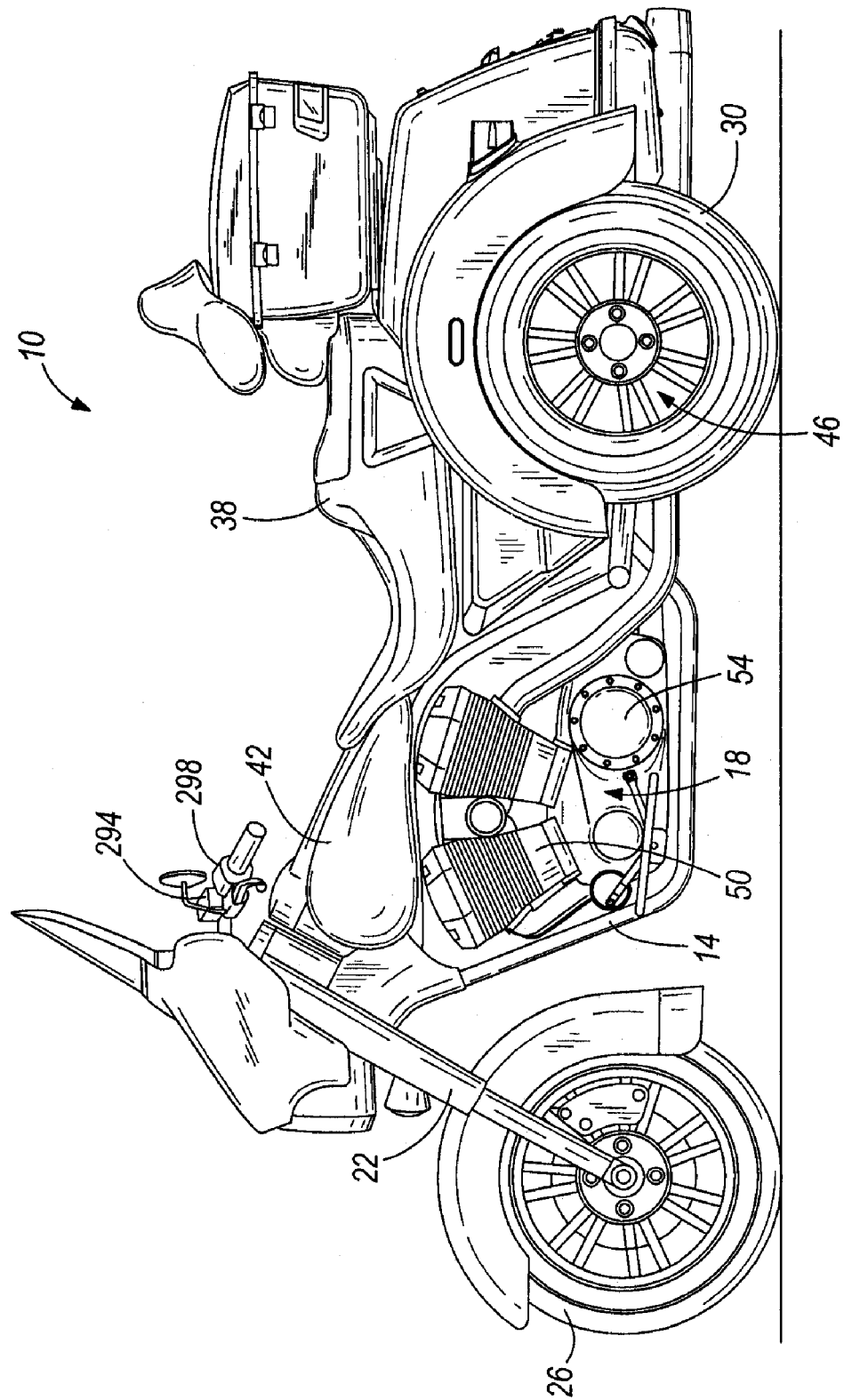
FIG. 1 is a side view of a three-wheeled vehicle according to one embodiment of the present invention.

FIG. 1 illustrates a vehicle 10 according to one embodiment of the invention. In the illustrated embodiment, the vehicle 10 is a three-wheeled vehicle, commonly known as a trike. The illustrated trike 10 includes a frame 14, an engine/transmission assembly 18, a front fork assembly 22, a front wheel 26, a pair of rear wheels 30, 34 (only one of which is shown in FIG. 1), a seat 38, a fuel tank 42, and a rear axle assembly 46 (FIGS. 2-7). The frame 14 supports the engine/transmission assembly 18, the front fork assembly 22, the seat 38, and the fuel tank 42. The illustrated front fork assembly 22 is pivotally mounted to the frame 14 and supports the front wheel 26. The seat 38 is mounted to the frame 14 behind the front fork assembly 22 and is configured for supporting a rider and a passenger. The fuel tank 42 is supported by the frame 14 and provides fuel to the engine/transmission assembly 18 during operation of the trike 10.

The engine/transmission assembly 18 is mounted to the frame 14 beneath the seat 38 and between the front wheel 26 and the rear wheels 30, 34 of the trike 10. In the illustrated embodiment, the engine/transmission assembly 18 includes an engine 50, such as a V-twin engine, and a transmission 54. The engine 50 includes an output shaft (not shown), or crankshaft, that supports a primary drive member (e.g., a sprocket, a gear, a pulley, or the like) for driving the transmission 54 with a primary loop member (e.g., a chain, a belt, or the like) in a conventional manner.

Figure 2:
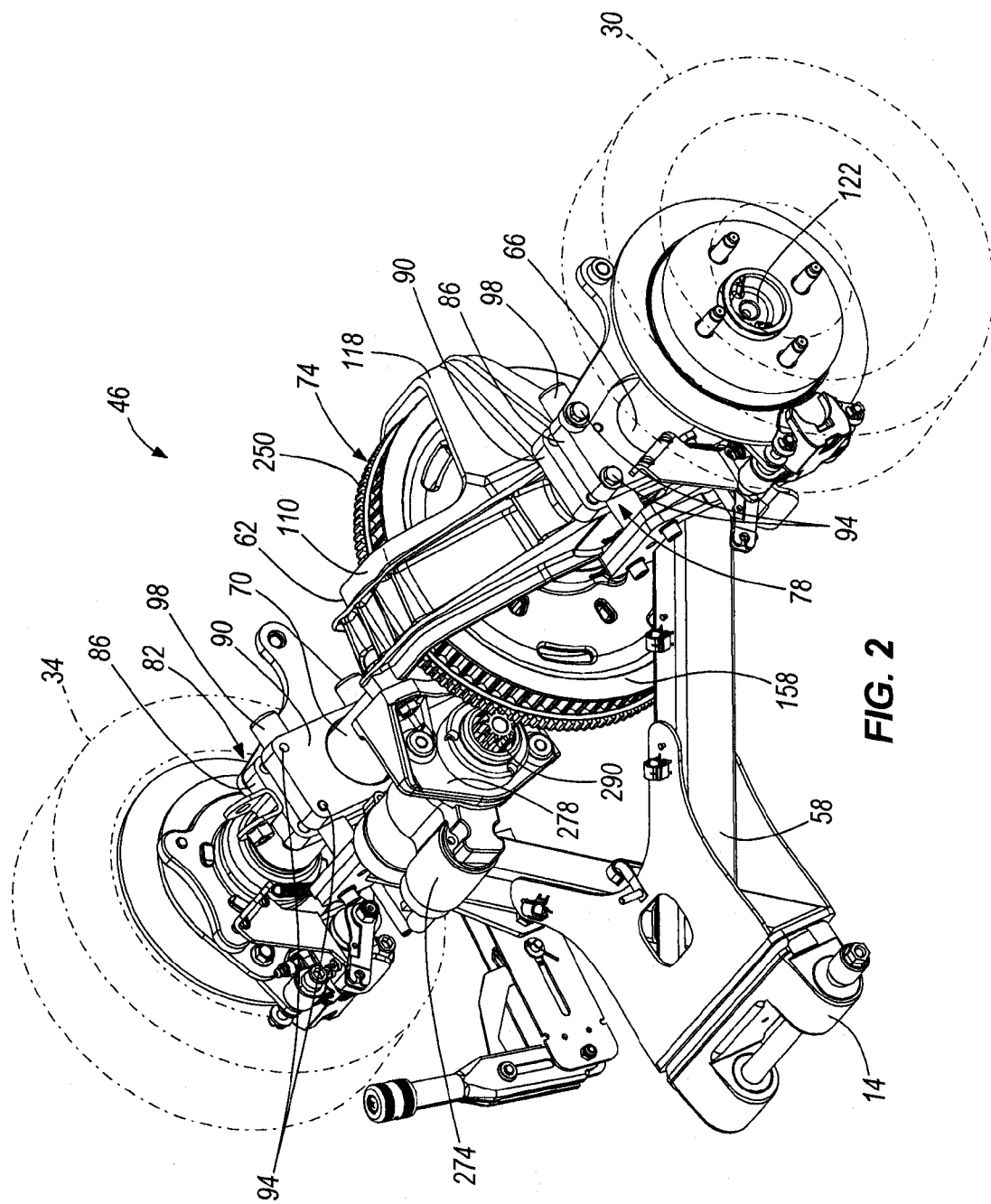
FIG. 2 is a perspective view of a rear portion of the three-wheeled vehicle shown in FIG. 1.

As shown in FIG. 2, the rear axle assembly 46 is mounted to a rear portion 58 of the frame 14. The illustrated rear axle assembly 46 includes a carrier housing 62, a first axle 66 coupled to the carrier housing 62, a second axle 70 coupled to the carrier housing 62, and a drive assembly 74 positioned substantially within the carrier housing 62. The rear axle assembly 46 also includes two suspension mounts 78, 82 supported by the first and second axles 66, 70 on opposite sides of the carrier housing 62. Each suspension mount 78, 82 includes a first plate member 86 fixedly coupled (e.g., welded or the like) to one of the axles 66, 70 and a second plate member 90 movably coupled to the axle 66, 70. Threaded fasteners 94 (e.g., bolts) couple the plate members 86, 90 together and pull the second plate members 90 toward the first plate members 86. When pulled together by the fasteners 94, the plate members 86, 90 partially surround and capture posts 98 extending from the rear portion 58 of the frame 14 to mount the rear axle assembly 46 to the trike frame 14.

As shown in FIGS. 2-7, the carrier housing 62 includes a pair of tubular end members 102, 106 and three strut members 110, 114, 118 extending between the end members 102, 106. The carrier housing 62 partially surrounds the drive assembly 74 to help protect and support the components of the drive assembly 74. In addition, the upper and lower strut members 110, 114 help resist bending of the rear axle assembly 46 in a vertical direction, while the rear strut member 118 helps resist bending of the rear axle assembly 46 in a fore-aft direction. Each strut member 110, 114, 118 includes gussets, ribs, and/or other structural features to increase the overall strength of the carrier housing 62. In the illustrated embodiment, the carrier housing 62 is composed of steel, cast iron, aluminum, or the like and is formed by, for example, welding, die casting, or sand casting. In other embodiments, the carrier housing 62 may be composed of other suitable materials and/or may be formed using other suitable techniques.

The first axle 66 is coupled to the first tubular end member 102 of the carrier housing 62 and extends away from the drive assembly 74 to support the first rear wheel 30. The second axle 70 is coupled to the second tubular end member 106 of the carrier housing 62 and extends away from the drive assembly 74 to support the second rear wheel 34. In the illustrated embodiment, the second axle 70 is substantially longer than the first axle 66 such that the drive assembly 74 is offset to one side of the longitudinal axis of the frame 14. In other embodiments, the first and second axles 66, 70 may be substantially the same length such that the drive assembly 74 is substantially centered relative to the longitudinal axis of the frame 14, or the first axle 66 may be substantially longer than the second axle 70 such that the drive assembly 74 is offset to the other side of the longitudinal axis of the frame 14.

Figure 6:
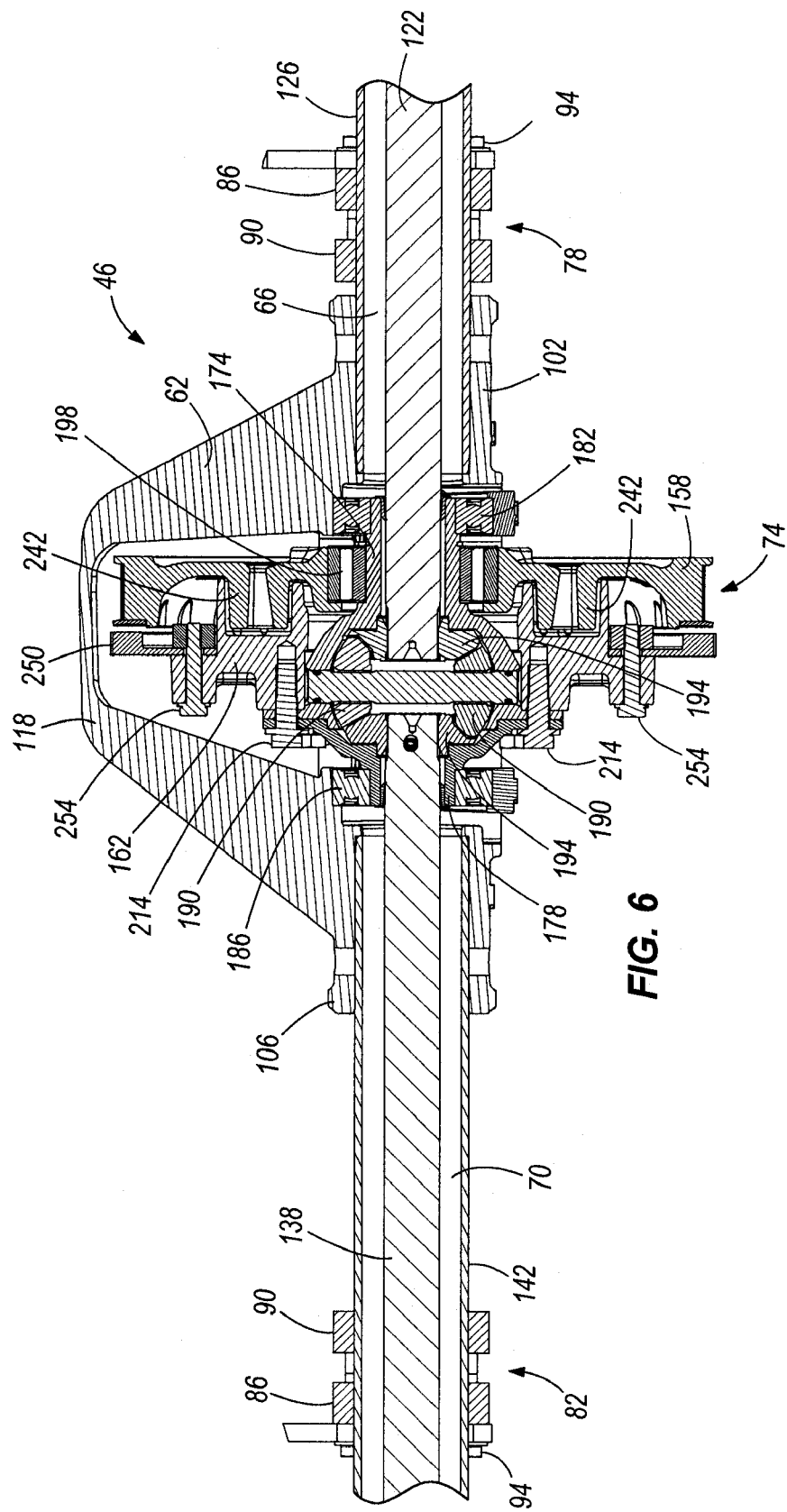
FIG. 6 is a cross-sectional view of the rear axle assembly taken along section line A-A of FIG. 5.

The illustrated first axle 66 includes an axle shaft 122 (FIGS. 2, 6 and 7), an axle tube 126, and a brake mount 130. As shown in FIG. 6, one end of the axle shaft 122 is coupled to and driven by the drive assembly 74. The other end of the axle shaft 122 includes a wheel flange (not shown) that couples to the first rear wheel 30 of the trike 10 to rotate the rear wheel 30 with the drive assembly 74. Referring back to FIGS. 2-7, the axle tube 126 surrounds and substantially encloses the axle shaft 122 to help protect the axle shaft 122. The illustrated axle tube 126 is press-fit and/or welded into the first tubular end member 102 of the carrier housing 62 to inhibit both axial and rotational movement of the axle tube 126 relative to the carrier housing 62. The brake mount 130 is coupled to an end of the axle tube 126 opposite the carrier housing 62. In the illustrated embodiment, the brake mount 130 is a plate-like structure configured to mount a caliper brake assembly to the first axle 66. In other embodiments, the brake mount 130 can be configured to mount other types of brakes, such as a drum brake, to the first axle 66.

Similar to the first axle 66, the second axle 70 includes an axle shaft 138 (FIGS. 6 and 7), an axle tube 142, and a brake mount 146. As shown in FIG. 6, one end of the axle shaft 138 is coupled to and driven by the drive assembly 74. The other end of the axle shaft 138 includes a wheel flange (not shown) that couples to the second rear wheel 34 of the trike 10 to rotate the rear wheel 34 with the drive assembly 74. Referring back to FIGS. 2-7, the axle tube 142 surrounds and substantially encloses the axle shaft 138 to help protect the axle shaft 138. The illustrated axle tube 142 is press-fit and/or welded into the second tubular end member 106 of the carrier housing 62 to inhibit both axial and rotational movement of the axle tube 142 relative to the carrier housing 62. The brake mount 146 is coupled to an end of the axle tube 142 opposite the carrier housing 62. Similar to the first brake mount 130, the second brake mount 146 is a plate-like structure configured to mount a caliper brake assembly to the second axle 70, but may alternatively mount, for example, a drum brake or other type of brake to the second axle 70.

The drive assembly 74 is positioned substantially within the carrier housing 62 and is coupled to the axle shafts 122, 138 of the first and second axles 66, 70 to rotate the rear wheels 30, 34 of the trike 10. In the illustrated embodiment, the drive assembly 74 includes a differential assembly 154, a drive sprocket 158, a compensator bowl 162, and a plurality of isolators 166. The differential assembly 154 includes a differential case 170, a first trunnion 174 configured to receive a portion of the first axle shaft 122, and a second trunnion 178 configured to receive a portion of the second axle shaft 138. A differential bearing 182, 186 (FIGS. 6 and 7) is coupled to each trunnion 174, 178 between the differential assembly 154 and the tubular end portions 102, 106 of the carrier housing 62 to rotatably mount the differential assembly 154 to the carrier housing 62. In the illustrated embodiment, the differential bearings 182, 186 are sealed roller bearings, although other suitable bearings may also be employed.

The illustrated differential assembly 154 is an open differential that includes a pair of pinion gears 190 and a pair of side gears 194 (FIG. 6) housed in the differential case 170. In other embodiments, the differential assembly 154 can be another type of differential such as, for example, a limited slip differential or a locking differential including other gear arrangements. The differential assembly 154 transmits rotation from the compensator bowl 162 and the drive sprocket 158 to the first axle shaft 122 and the second axle shaft 138 to allow the first and second axle shafts 122, 138 to rotate relative to one another.

The drive sprocket 158, or drive member, surrounds a portion of the first trunnion 178 of the differential assembly 154. A bearing set 198 (FIGS. 6 and 7) is positioned between the drive sprocket 158 and the first trunnion 178 to mount the sprocket 158 to the trunnion 178 and allow the drive sprocket 158 to rotate relative to the differential assembly 154. A retaining ring 202 (FIG. 7) sits in an annular groove 206 formed in the first trunnion 178 to prevent lateral movement of the bearing set 198 along the trunnion 178.

The illustrated drive sprocket 158 includes a series of radially extending teeth 210 formed on an outer circumference of the sprocket 158. The teeth 210 engage the primary loop member (e.g., a belt) of the transmission 54. In other embodiments, different structures may be formed on the circumference of the drive sprocket 158 to engage different types of loop members, such as, for example, a chain or even a gear train. When the engine/transmission assembly 18 of the trike 10 is running, the loop member engages the drive sprocket 158 to rotate the sprocket 158 in a forward direction. As further described below, the drive sprocket 158 rotates the compensator bowl 162, the differential assembly 154, and the axle shafts 122, 138 to propel the trike 10 in the forward direction.

Figure 7:
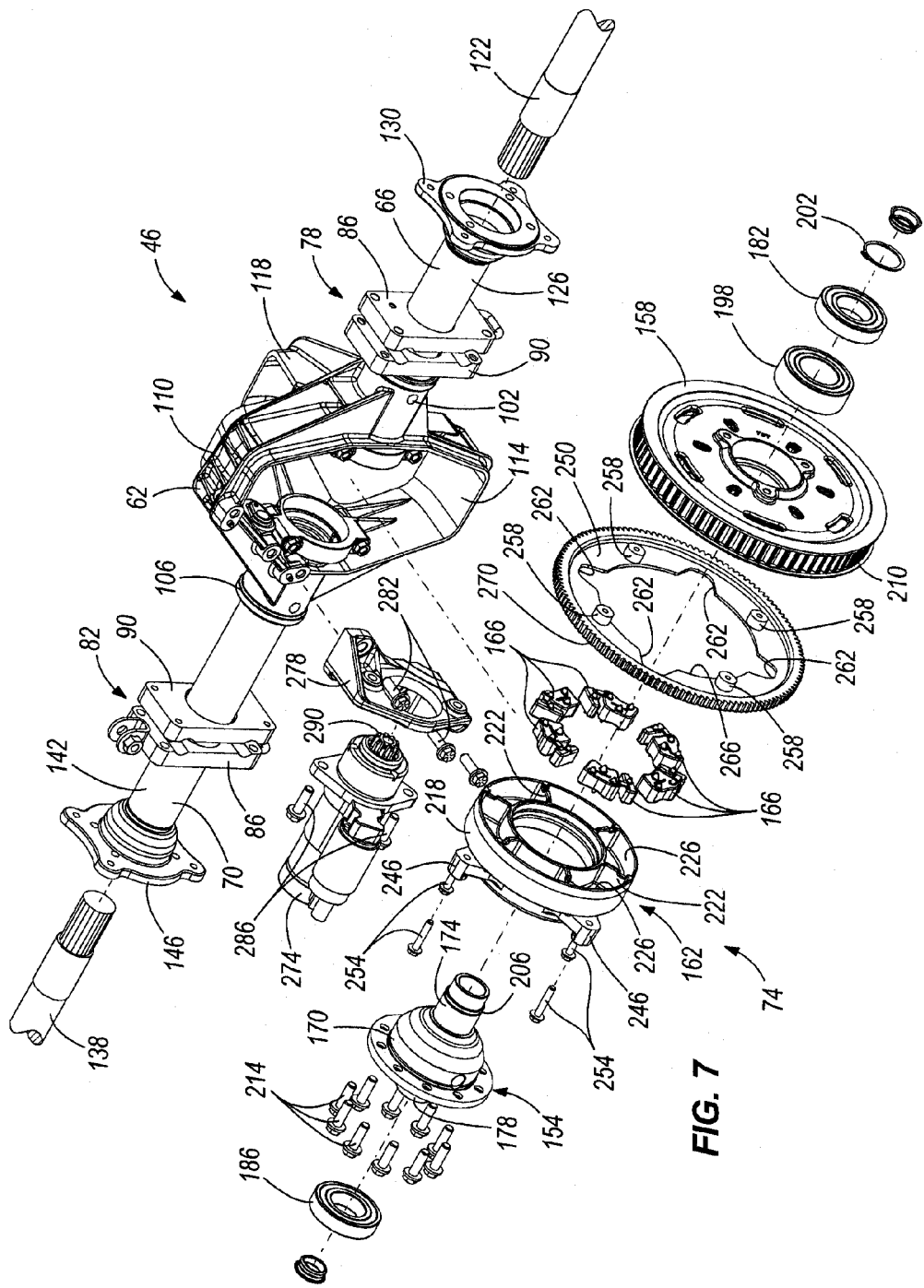
FIG. 7 is an exploded perspective view of the rear axle assembly shown in FIG. 3.
Figure 8:
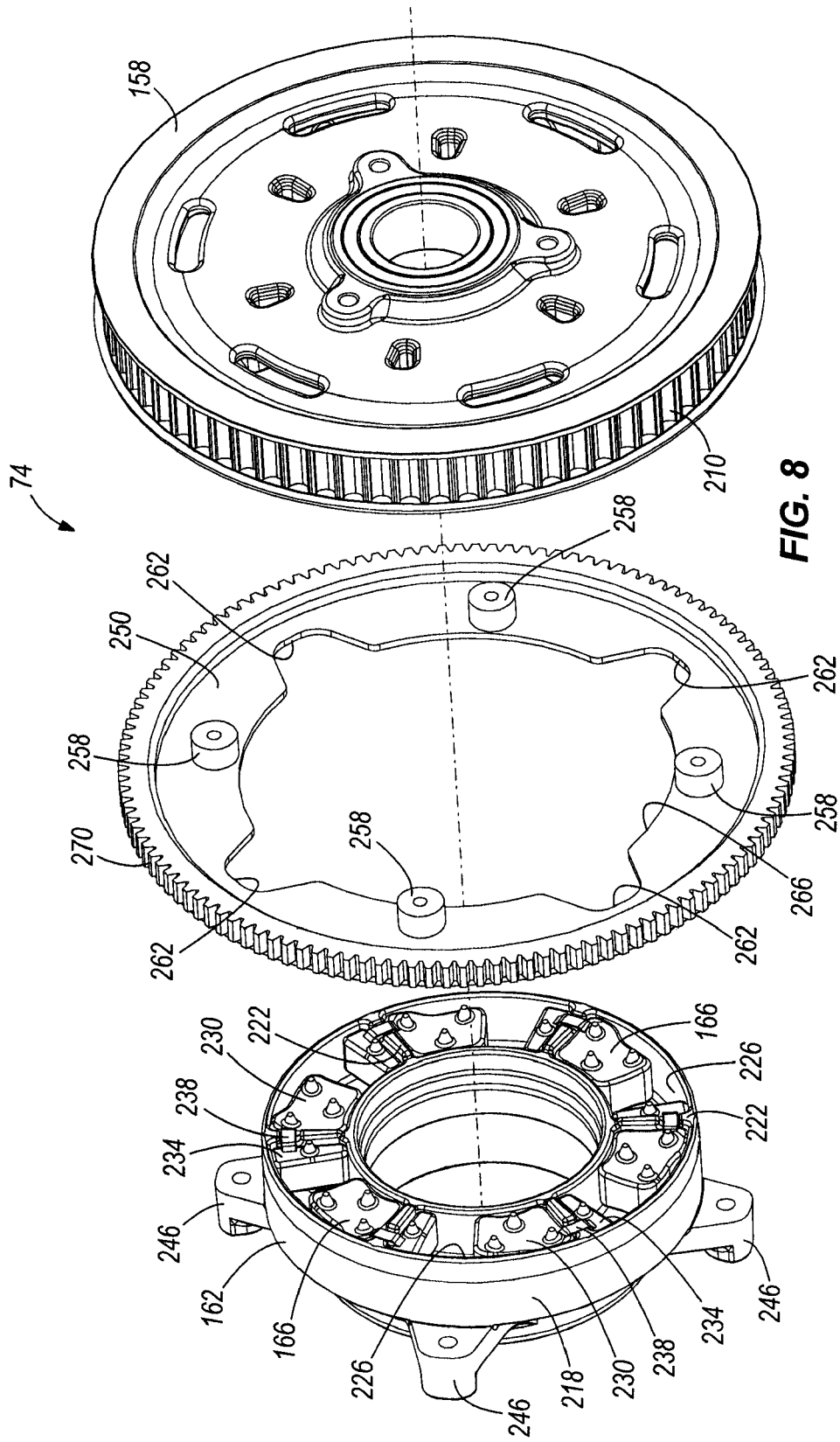
FIG. 8 is an exploded perspective view of a portion of the rear axle assembly shown in FIG. 3.

The compensator bowl 162 surrounds a portion of the differential case 170 and is coupled to the differential assembly 154 via fasteners 214 (e.g., bolts). The compensator bowl 162 is also coupled to the drive sprocket 158 through the plurality of isolators 166. As shown in FIGS. 7 and 8, the compensator bowl 162 includes a bowl portion 218 having a plurality of radially extending dividers 222. The dividers 222 define pockets 226 within the bowl portion 218. In the illustrated embodiment, the bowl portion 218 includes six dividers 222 defining six pockets 226 corresponding to the six isolators 166. In other embodiments, the bowl portion 218 may define fewer or more pockets 226 to receive fewer or more isolators 166.

Referring to FIG. 8, each isolator 166 includes a large portion 230 positioned within one pocket 226 and a small portion 234 positioned within an adjacent pocket 226. The portions 230, 234 of the isolators 166 are connected together by a bridge portion 238 that extends over one of the dividers 222. The drive sprocket 158 includes corresponding dividers or projections 242 (FIG. 7) extending into the bowl portion 218 of the compensator bowl 162. The projections 242 engage the isolators 166 such that, as the drive sprocket 158 rotates, the isolators 166 transmit the rotation to the compensator bowl 162. In the illustrated embodiment, the isolators 166 are composed of a resilient, elastic material that partially deflects when the drive sprocket 158 rotates. In other embodiments, the isolators 166 may be composed of other suitable materials and/or may have a different configuration. The isolators 166, or elastic members, thereby allow some relative rotational movement between the drive sprocket 158 and the compensator bowl 162 to absorb torque fluctuations during operation of the trike 10.

The illustrated compensator bowl 162 also includes four projections 246 (only three of which are shown) extending radially outwardly therefrom. A ring gear 250 is positioned about the bowl portion 218 of the compensator bowl 162 adjacent to the projections 246. Fasteners 254 (e.g., bolts) extend through the projections 246 and corresponding bosses 258 formed on the ring gear 250 to couple the ring gear 250 to the compensator bowl 162. In the illustrated embodiment, the ring gear 250 is also shrunk fit onto the compensator bowl 162. Such an arrangement permanently fixes the ring gear 250 to the compensator bowl 162 such that the ring gear 250 is part of the compensator bowl 162. In other embodiments, the ring gear 250 may be permanently attached to the compensator bowl 162 using other fixing means such as, for example, welding or press-fitting. In further embodiments, the ring gear 250 may be integrally formed or machined as a single component with the compensator bowl 162. In still other embodiments, the ring gear 250 may be removably coupled to the compensator bowl 162.

As shown in FIGS. 7 and 8, the ring, or reverse, gear 250 includes four cutouts 262 formed along an inner perimeter 266 of the ring gear 250 and a series of radially extending teeth 270 formed on an outer circumference of the gear 250. The cutouts 262 facilitate assembling and/or removing the ring gear 250 from the compensator bowl 162 when the compensator bowl 162 is positioned directly adjacent to the drive sprocket 158. For example, the cutouts 262 are shaped and sized to fit over the projections 246 extending from the compensator bowl 162. To position the ring gear 250 about the bowl portion 218, the cutouts 262 are aligned with the projections 246 and the ring gear 250 is slid onto the compensator bowl 162 from a side of the bowl 162 opposite the drive sprocket 158. Once the ring gear 250 is positioned between the projections 246 of the compensator bowl 162 and the drive sprocket 158, the ring gear 250 is rotated (e.g., about 45°) to align the projections 246 with the bosses 258 of the ring gear 250. The fasteners 254 are then inserted through the projections 246 and the bosses 258 to fix the ring gear 250 to the compensator bowl 162.

As mentioned above, the isolators 166 are positioned between the drive sprocket 158 and the compensator bowl 162. The ring gear 250 is fixed to the compensator bowl 162 such that the isolators 166 are also positioned between the drive sprocket 158 and the ring gear 250. The isolators 166 thereby allow some relative rotation between the drive sprocket 158 and the ring gear 250 to separate, or isolate, the drive sprocket 158 from the ring gear 250. In such an arrangement, the drive sprocket 158 is positioned on one torque transmitting side of the compensation mechanism (e.g., the compensator bowl 162 and the isolators 166), while the ring gear 250 is positioned on the other torque transmitting side of the compensation mechanism. That is, the drive sprocket 158 drives the axle shafts 122, 138 through the isolators 166, while the ring gear 250 drives the axle shafts 122, 138 directly (i.e., the ring gear 250 cannot rotate relative to the axle shafts 122, 138). In other embodiments, the positions of the drive sprocket 158 and the ring gear 250 relative to the compensation mechanism may be reversed such that the drive sprocket 158 drives the axle shafts 122, 138 directly, while the ring gear 250 drives the axle shafts 122, 138 through the isolators 166.

The rear axle assembly 46 also includes a motor 274 configured to engage the ring gear 250. The illustrated motor 250 is an electric motor mounted to the carrier housing 62 of the rear axle assembly 46. As shown in FIGS. 2-7, a mounting bracket 278 receives a portion of the motor 274 and is coupled to the carrier housing 62 with fasteners 282 (e.g., bolts). The motor 274 is also coupled to the mounting bracket 278 with additional fasteners 286 (e.g., bolts). The mounting bracket 278 supports the motor 274 adjacent to the ring gear 250 such that the motor 274 drives the ring gear 250 to rotate the axle shafts 122, 138 in a reverse direction.

Figure 3:
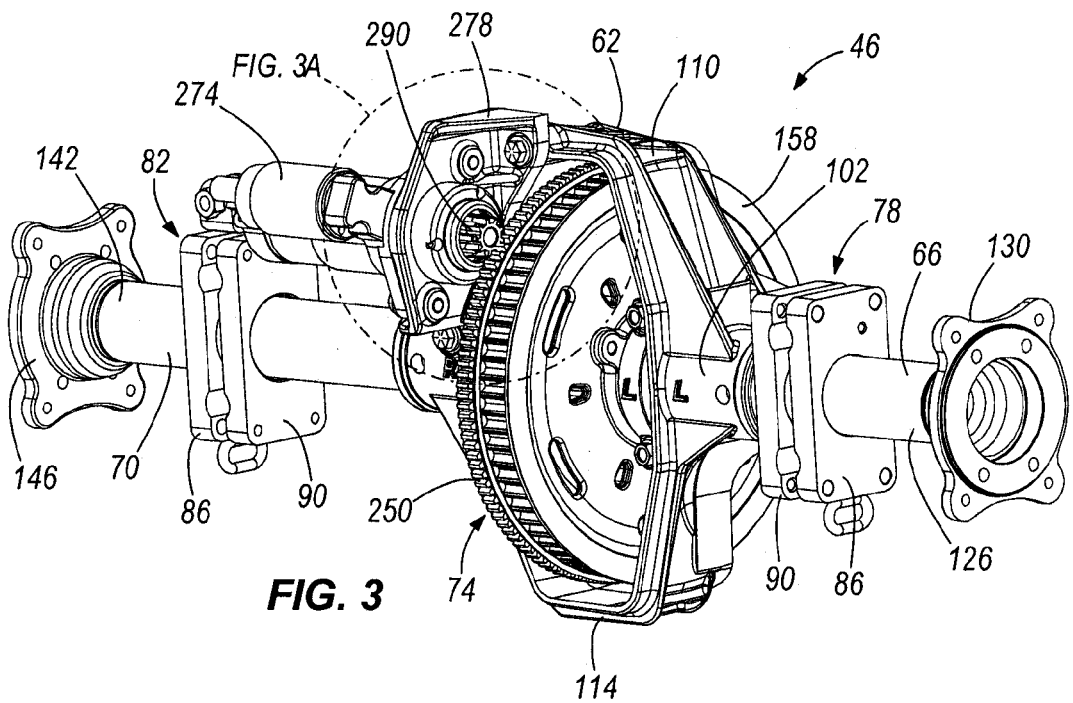
FIG. 3 is a perspective view of a rear axle assembly for use with the three-wheeled vehicle shown in FIG. 1.
Figure 3A:
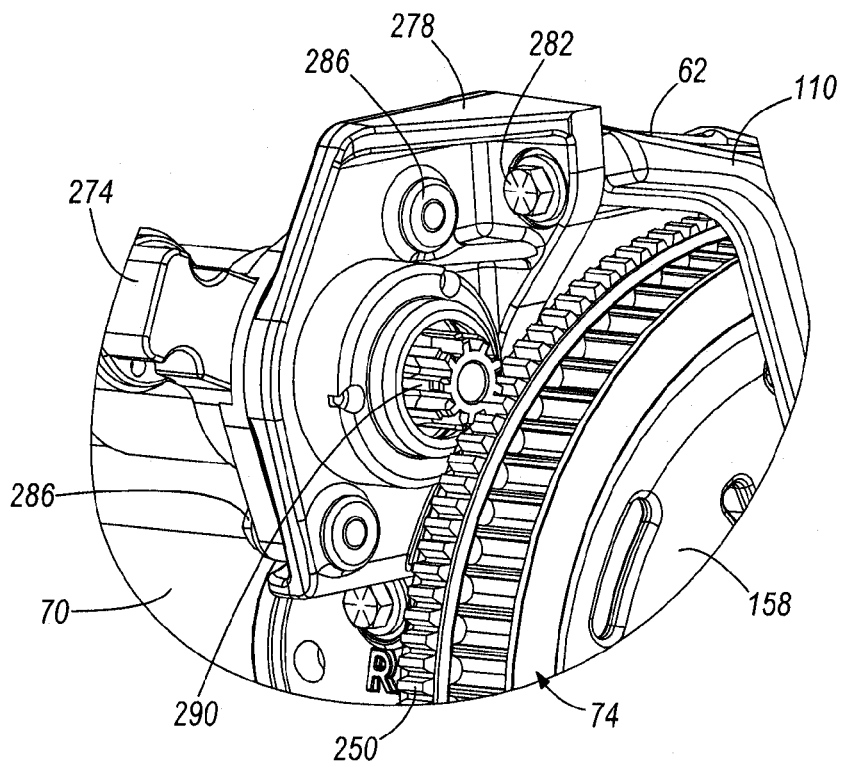
FIG. 3A is an enlarged perspective view of a portion of the rear axle assembly shown in FIG. 3.
Figure 4:
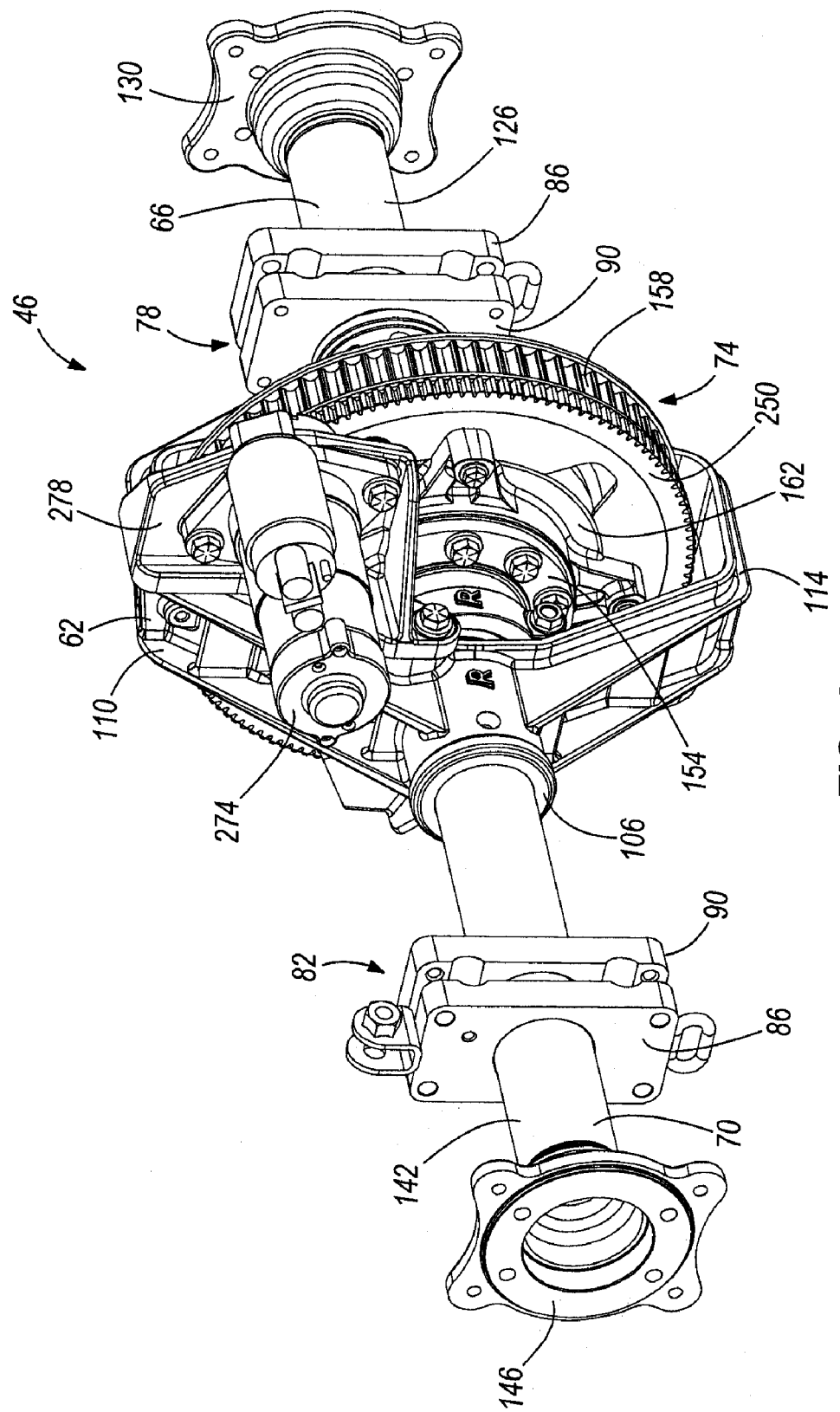
FIG. 4 is another perspective view of the rear axle assembly shown in FIG. 3.
Figure 5:
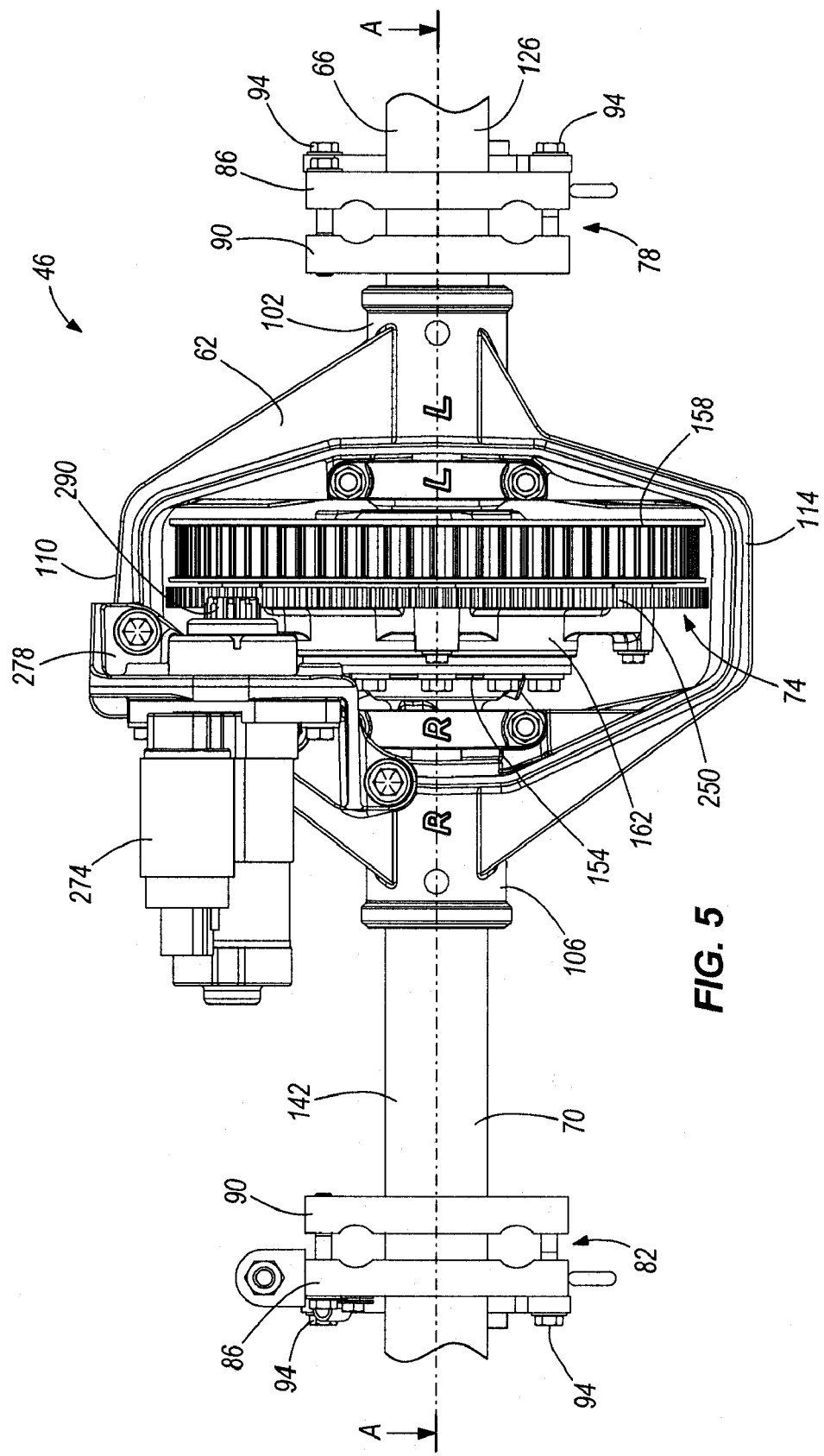
FIG. 5 is a front view of the rear axle assembly shown in FIG. 3.

Referring to FIG. 3A, the motor 274 includes a pinion gear 290 extending axially from the motor 274. The pinion gear 290 intermeshes with the teeth 270 on the ring gear 250 to rotate the ring gear 250 in the reverse direction (i.e., in a direction substantially opposite the forward direction of rotation provided by the drive sprocket 158 and the engine/transmission assembly 18). The ring gear 250 is fixed to the compensator bowl 162 such that the compensator bowl 162 also rotates in the reverse direction during operation of the motor 274. Similar to operation in the forward direction, the compensator bowl 162 transmits the rotation in the reverse direction to the differential assembly 154. The differential assembly 154 in turn transmits the rotation to the axle shafts 122, 138 to rotate the axle shafts 122, 138 and the rear wheels 30, 34, propelling the trike 10 in the reverse direction.

In some embodiments, the pinion gear 290 of the motor 274 may be retractable relative to the ring gear 250. That is, the pinion gear 290 may be axially movable from an engaged position (as shown in FIG. 3A) where the pinion gear 290 engages the teeth 270 of the ring gear 250, to a disengaged position where the pinion gear 290 is at least partially retracted into the motor 274 and spaced apart from the ring gear 250. Such an arrangement eliminates unnecessary rotation of the internal components of the motor 274 when the drive sprocket 158 is rotated to propel the trike 10 in the forward direction. In other embodiments, the pinion gear 190 may remain in constant engagement with the ring gear 250 when the drive sprocket 158 is rotated in the forward direction. In such embodiments, the motor 274 can include a one-way clutch to allow the pinion gear 290 to freely spin with the drive sprocket 158 without rotating the internal components of the motor 274.

In the illustrated embodiment, the motor 274 is electrically coupled to a battery of the trike 10 and/or an alternator of the engine/transmission assembly 18. The motor 274 is also electrically coupled to a switch assembly 294 (FIG. 1) on a handlebar portion 298 of the front fork assembly 22. The switch assembly 294 is actuatable by a driver of the trike 10 to engage the pinion gear 290 with the ring gear 250 and operate the motor 274. In other embodiments, the switch assembly 294 may be located elsewhere on the trike 10. In some embodiments, the switch assembly 294 may be in electrical communication with a control circuit that ensures the transmission 54 of the trike 10 is in neutral before allowing operation of the motor 274.

To drive the trike 10 in the forward direction, the engine/transmission assembly 18 is engaged to rotate the primary drive member and, thereby, drive the primary loop member. The primary loop member engages the drive sprocket 158 on the rear axle assembly 46 to rotate the drive sprocket 158 in the forward direction. Rotation of the drive sprocket 158 is transmitted through the isolators 166 to the compensator bowl 162, rotating the compensator bowl 162 in the forward direction. The compensator bowl 162 is bolted to the differential assembly 154 such that, as the compensator bowl 162 rotates in the forward direction, the differential assembly 154 also rotates in the forward direction. The differential assembly 154 is coupled to the axle shafts 122, 138 of the first and second axles 66, 70, which are in turn coupled to the rear wheels 30, 34 of the trike 10. Rotation of the gears 190, 194 in the differential assembly 154 in the forward direction is thereby transmitted to the rear wheels 30, 34 to propel the trike 10 in the forward direction.

To drive the trike 10 in the reverse direction, the transmission 54 of the trike 10 is placed in neutral. The engine 50 may be left running during operation of the trike 10 in the reverse direction or may be shut off. The switch assembly 294 on the handlebar portion 298 of the trike 10 is actuated to turn the motor 274 on and to engage the pinion gear 290 of the motor 274 with the teeth 270 on the ring gear 250. Further actuation of the switch assembly 294 operates the motor 274 to rotate the pinion gear 290, and thereby the ring gear 250, in the reverse direction. Since the ring gear 250 is fixed to the compensator bowl 162, rotating the ring gear 250 in the reverse direction also rotates the compensator bowl 162 in the reverse direction. As discussed above, the compensator bowl 162 is bolted to the differential assembly 154 such that, as the compensator bowl 162 rotates in the reverse direction, the differential assembly 154 is rotated in the reverse direction. Rotation of the gears 190, 194 in the differential assembly 154 in the reverse direction is transmitted to the rear wheels 30, 34 through the axle shafts 122, 138 to propel the trike 10 in the reverse direction.

When rotating in the reverse direction, the compensator bowl 162 also transmits rotation to the drive sprocket 158 through the isolators 166. The drive sprocket 158 thereby drives the primary loop member and a portion of the transmission 50 (which is in neutral) in the reverse direction. The isolators 166 even out (e.g., absorb) torque fluctuations, or pulses, from the reverse motor 274 to the transmission 50.

Various features and advantages of the invention are set forth in the following claims.

What is claimed is:

1. A rear axle assembly for a vehicle, the vehicle including an engine and a rear wheel, the rear axle assembly comprising:
   an axle configured to couple to the rear wheel;
   a compensator bowl coupled to the axle and including a ring gear;
   a drive member coupled to the compensator bowl, the drive member configured to be driven by the engine to rotate the axle in a forward direction; and
   a motor selectively engageable with the ring gear, the motor operable to drive the ring gear to rotate the axle in a reverse direction.

2. The rear axle assembly of claim 1, wherein the ring gear is shrunk fit onto the compensator bowl.

3. The rear axle assembly of claim 1, further comprising a carrier housing coupled to the axle and surrounding at least a portion of the compensator bowl and the drive member, wherein the motor is mounted to the carrier housing adjacent to the ring gear.

4. The rear axle assembly of claim 1, wherein the motor includes a pinion gear, and wherein the pinion gear is movable between a first position, in which the pinion gear engages the ring gear to rotate the axle in the reverse direction, and a second position, in which the pinion gear is spaced apart from the ring gear.

5. The rear axle assembly of claim 1, further comprising a switch assembly electrically coupled to the motor, wherein the switch assembly is operable to control the motor to rotate the axle in the reverse direction.

6. The rear axle assembly of claim 1, further comprising at least one elastic isolator positioned between the compensator bowl and the drive member, wherein the at least one elastic isolator absorbs torque fluctuations when the axle is rotated in at least one of the forward direction and the reverse direction.

7. The rear axle assembly of claim 6, wherein the compensator bowl and the drive member define at least one pocket therebetween, and wherein the at least one elastic isolator is positioned substantially within the at least one pocket to absorb torque fluctuations between the drive member and the compensator bowl.

8. The rear axle assembly of claim 1, wherein the rear wheel is a first rear wheel and the axle is a first axle configured to couple to the first rear wheel, and wherein the rear axle assembly further comprises a second axle configured to couple to a second rear wheel of the vehicle, and wherein the compensator bowl is coupled to the second axle to rotate the second axle in the forward and reverse directions.

9. The rear axle assembly of claim 8, further comprising a differential assembly coupled to the compensator bowl, the first axle, and the second axle, wherein the differential assembly transmits rotation of the drive member to the first and second axles to rotate the first and second axles in the forward direction, wherein the differential assembly transmits rotation of the ring gear to the first and second axles to rotate the first and second axles in the reverse direction, and wherein the differential assembly allows relative rotation between the first and second axles.

10. A vehicle comprising:
    a rear wheel;
    an axle coupled to the rear wheel;
    a compensator bowl coupled to the axle and including a ring gear;
    a drive member coupled to the compensator bowl;
    an engine coupled to the drive member, the engine operable to drive the drive member to rotate the axle in a forward direction; and
    a motor selectively engageable with the ring gear, the motor operable to drive the ring gear to rotate the axle in a reverse direction.

11. The vehicle of claim 10, wherein the ring gear is shrunk fit onto the compensator bowl.

12. The vehicle of claim 10, further comprising a carrier housing coupled to the axle and surrounding at least a portion of the compensator bowl and the drive member, wherein the motor is mounted to the carrier housing adjacent to the ring gear.

13. The vehicle of claim 10, wherein the motor includes a pinion gear, and wherein the pinion gear is movable between a first position, in which the pinion gear engages the ring gear to rotate the axle in the reverse direction, and a second position, in which the pinion gear is spaced apart from the ring gear.

14. The vehicle of claim 10, further comprising a switch assembly electrically coupled to the motor, wherein the switch assembly is operable to control the motor to drive the axle in the reverse direction.

15. The vehicle of claim 10, further comprising at least one elastic isolator positioned between the compensator bowl and the drive member, wherein the at least one elastic isolator absorbs torque fluctuations when the axle is rotated in at least one of the forward direction and the reverse direction.

16. The vehicle of claim 10, wherein the rear wheel is a first rear wheel and the axle is a first axle coupled to the first rear wheel, and wherein the vehicle further comprises a second axle coupled to a second rear wheel of the vehicle, and wherein the compensator bowl is coupled to the second axle to rotate the second axle in the forward and reverse directions.

17. The vehicle of claim 16, further comprising a differential assembly coupled to the compensator bowl, the first axle, and the second axle, wherein the differential assembly transmits rotation of the drive member to the first and second axles to rotate the first and second axles in the forward direction, wherein the differential assembly transmits rotation of the ring gear to the first and second axles to rotate the first and second axles in the reverse direction, and wherein the differential assembly allows relative rotation between the first and second axles.

18. A rear axle assembly for a vehicle, the vehicle including an engine and a rear wheel, the rear axle assembly comprising:

an axle configured to couple to the rear wheel;
a drive member coupled to the axle, the drive member configured to be driven by the engine to rotate the axle in a forward direction;
a gear coupled to the axle;
a motor selectively engageable with the gear, the motor operable to drive the gear to rotate the axle in a reverse direction;
at least one elastic member positioned between the drive member and the gear to isolate the drive member from the gear; and
a carrier housing coupled to the axle and surrounding at least a portion of the drive member and the gear, wherein the motor is mounted to the carrier housing adjacent to the gear.

19. The rear axle assembly of claim 18, wherein the gear is fixed to a compensator bowl, and wherein the at least one elastic member is at least partially positioned within the compensator bowl to isolate the drive member from the compensator bowl.

* * * * *